May 17, 1955
J. J. COLEMAN
2,708,685
PRIMARY CELL
Filed Nov. 28, 1952
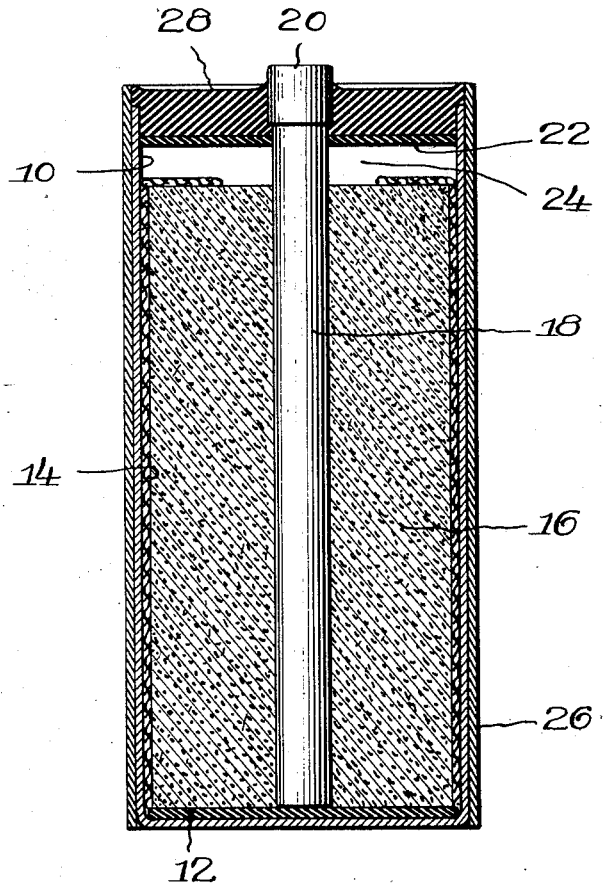
Inventor,
Joseph J. Coleman,
By:
Jones, Jesch & Darbo,
Attys.

2,708,685
PRIMARY CELL

Joseph J. Coleman, Freeport, Ill., assignor to Burgess Battery Company, Freeport, Ill., a corporation of Delaware Application November 28, 1952, Serial No. 322,913

9 Claims. (Cl. 136—124)

This invention relates to improvements in primary cells, and particularly to improvements in primary cells adapted for operation at low temperatures, by which is meant temperatures between 0° F. and —60° F.

It is the object of the invention to provide a primary cell having improved performance characteristics in the low temperature range.

In Patents Nos. 2,403,571 and 2,569,491 there are disclosed primary cells of the Leclanché type which are adapted for operation at low temperatures, and it is to the improvement of cells of this character that the present invention is directed.

In Patent 2,403,571, a cell is disclosed having zinc and carbon electrodes and a depolarizer mix composed of manganese dioxide and carbon. To adapt the cell for low temperature operation an electrolyte is provided containing lithium chloride either alone or together with either or both of ammonium chloride and zinc chloride. There is disposed between the depolarizing mix and zinc electrode a bibulous non-conductive separating member composed of gelatinized starch or paper. In Patent 2,569,491 a generally similar cell is disclosed which is adapted for low temperature operation by the provision of an electrolyte containing calcium chloride, ammonium chloride and zinc chloride.

In accordance with the present invention, it has been discovered that the provision of a bibulous separating member composed of starch coated and impregnated cloth or fabric results in improved low temperature performance, specifically increased cell capacity. The reason for this superiority of cloth over paper as a separator material is not understood, and it is the more surprising because paper is superior to cloth in cells operating at ordinary temperatures.

To provide an understanding of the invention it will be described in connection with a specific embodiment of a primary cell. It is to be understood that such embodiment is illustrative only and that the invention is not limited to any particular structure.

The single figure of the accompanying drawing is a sectional view of a primary cell in accordance with the invention.

The primary cell illustrated is a dry cell of the cylindrical type. The negative electrode is the open-top cylindrical zinc cup 10. Upon the bottom of cup 10 is disposed a layer 12 of suitable non-conductive electrolyte-resistant material such as blotting paper, paper board, resin composition, heat-fusible wax or pitch, or the like. Against the interior cylindrical surface of the zinc cup 10 is arranged the bibulous non-conductive layer 14 which, in accordance with the present invention, is composed of starch coated and impregnated cloth, and is moistened with liquid electrolyte. Layer 14 will be described more in detail hereinafter. Within the cup 10 and resting on bottom layer 12 and in contact with cylindrical layer 14 is the compressed body of depolarizing mix 16 which may be the mixture used in conventional dry cells composed of powdered manganese dioxide and conductive material, such as carbon or graphite, said mixture being moistened with the liquid electrolyte of the cell. As shown in the drawing, the separating layer 14 extends above the mix body 16 and is folded inwardly on the top of said body. Embedded centrally in the depolarizing body 16 is the upright rod-shaped positive electrode 18 which may be composed of carbon and has the metal cap 20 upon its upper end.

The depolarizing body 16 when moistened with the electrolyte is plastic and is compacted in position, whereby it makes firm contact with the carbon rod 18 and the layer 14. Elements 16 and 18 together serve as the positive electrode of the cell. The layer 14 serves as a bibulous separating member which prevents conductive contact between the mix 16 and the negative electrode 10 and at the same time absorbs electrolyte and makes possible the electrolytic action of the cell.

A washer 22 of non-conductive, electrolyte-resistant material such as paper or cardboard is spaced above the top of the depolarizing body 16, thereby providing the space 24 for the reception of gases or liquids which may be produced during the operation of the cell. A cylindrical jacket 26 of non-conductive material such as cardboard surrounds the cylindrical wall of zinc cup 10 and extends a short distance above the top of the zinc cup. A heat-fusible seal closure 28, which may be composed of wax or pitch, rests on washer 22 and makes an adhesive sealing joint with the carbon rod 18 and metal cap 20 and also with the upper portions of the zinc cup 10 and outer jacket 26.

The electrolyte may be composed of an aqueous solution containing lithium chloride as disclosed in Patent 2,403,571. By "electrolyte" is meant the liquid electrolyte which is contained in both the layer 14 and the mix 16. The electrolyte compound may consist of lithium chloride alone or lithium chloride in combination with one or both of ammonium chloride and zinc chloride. With lithium chloride alone, 30 to 45 parts of LiCl to 100 parts by weight of water is satisfactory. When ammonium chloride and/or zinc chloride are present, the following proportions are satisfactory:

| | Parts by weight |
|---|---|
| Water | 100 |
| LiCl | 10 to 45 |
| NH$_4$Cl | Up to 37 |
| ZnCl$_2$ | Up to 80 |

The electrolyte may contain calcium chloride to impart low temperature performance as disclosed in Patent 2,569,491. A suitable composition is as follows:

| | Parts by weight |
|---|---|
| Water | 40 to 65 |
| CaCl$_2$.2H$_2$O | 10 to 30 |
| NH$_4$Cl | 5 to 20 |
| ZnCl$_2$ | 10 to 40 |

In accordance with the present invention, separator 14 is composed of porous, flexible cloth or fabric coated and impregnated with starch. Any thin, open-mesh, non-conductive fabric with fine meshes may be used. A light weight cotton fabric is preferred but other fabrics may be used. A fabric which has been used successfully is cotton print cloth having a thread count of 64–60 (64 warp and 60 woof threads to the inch). Another fabric which has been used successfully is a woven cotton fabric which resembles cheese cloth and has a thread count of 44–45.

Starch compositions for use in dry cells are known and any suitable starch composition may be used moistened with sufficient water or liquid electrolyte to make a plastic paste. It may be composed of any suitable cereal, such as wheat, corn, potato, tapioca, or the like, or it may be a mixture of several cereals. The cereal may be in the form of a powdered starch or a mixture of starch and flour.

In the cell of the invention it is preferred to have mercury available at the surface of the zinc negative electrode which is exposed to the electrolyte in order to inhibit local action at said electrode. This may conveniently be accomplished by including a mercury compound in the starch composition applied to the cloth separator. A mercury compound may be used which is soluble in water to a limited extent, i. e., not more than 0.1 gram per 100 grams of water, as is diclosed in United States Patent 2,598,226. Examples of suitable compounds are mercurous chloride, mercurous bromide, mercurous iodide, mercurous sulfate and mercuric phosphate. A small amount of the mercury compound is sufficient, an amount providing .025 milligram of mercury per square centimeter of area of the separator being sufficient. Examples of suitable starch compositions are as follows, the parts being by weight.

*Example 1*

| | |
|---|---|
| Corn starch | 20 |
| Tapioca flour | 10 |
| Dextrine | 3 |
| Mercurous chloride | 0.7 |

*Example 2*

| | |
|---|---|
| Corn starch | 20 |
| Wheat flour | 10 |
| Gelatinized corn starch | 3 |
| Mercurous chloride | 0.7 |

In each case sufficient water is added to make a fluid paste, preferably of the consistency of a paint, and the paste is preferably thoroughly mixed in a colloid mill to provide uniform consistency.

The paste is coated upon both sides of the cloth sheet by any suitable coating method, such as spraying, brushing or passing the sheet in contact with the upper portion of a rotating roll the lower portion of which is immersed in a body of the paste. Preferably several coatings are applied to each side of the sheet and the sheet is then dried. The application is controlled so that the coated sheet carries approximately .004 to .008 gram of the composition, based on the dry weight of the ingredients, per square centimeter of area of the sheet. The starch composition fills the meshes of the sheet and is present as a coating on both surfaces thereof. At the meshes, the composition extends continuously through the sheet from the surface of one coating to the surface of the other. The coated cloth is readily flexible, which is an advantage in handling an insertion in the cell. In the assembly of the cell, the starch coated and impregnated cloth separator is inserted in the zinc cup 10 in the dry condition, and after the mix 16, which is moistened with the liquid electrolyte, is compacted in place, the separator 14 absorbs electrolyte from the mix to provide a body of electrolyte in contact with the negative electrode 10 and extending between said electrode and the mix body 16. The mercury compound in the separator progressively goes into solution in the electrolyte and becomes available at the surface of the negative electrode 10 where it serves to inhibit local action.

In order to show the superior properties imparted to the low temperature cell by the use of the starch coated cloth separator, data are given hereinafter for cells using starch coated cloth and starch coated paper. The cells were of the same construction except for the material of the separator. They were of the cylindrical type described hereinbefore and of the flashlight size, i. e., having a diameter of 1¼ inches and a height of 2¼ inches. The depolarizing mix was composed of 87.5 parts of manganese dioxide and 12.5 parts of thermal acetylene black. The mix was moistened with liquid electrolyte of the following approximate composition, in parts by weight:

| | |
|---|---|
| Ammonium chloride | 7 |
| Zinc chloride | 14 |
| Lithium chloride | 15 |
| Chromium trioxide | 0.4 |
| Water | 63.6 |

The starch composition was the same as in Example 1 in the foregoing and for one group of cells it was applied to the cloth first described in the foregoing, having a thread count of 64–60. For the other group of cells the same starch composition was applied to a battery paper, which is a commercially available kraft paper regularly used for dry cell separators. The cells were subjected to the Army-Navy BA–30 test at a temperature of −40° F. In accordance with this test, two cells are connected in series with each other and a resistance of 13.33 ohms for 4 minutes each half hour, 10 hours per day, 5 days per week. The capacity is reckoned in days of total time from the start of the test until the closed circuit voltage has fallen to 1.87 volts for the two cells in series.

A number of the cells having the starch-coated paper separator exhibited an average capacity of 1.95 days, and a similar number of cells having the starch-coated cloth separator exhibited an average capacity of 3.32 days. The superior capacity resulting from the use of cloth instead of paper for the material of the separator is evident from the foregoing data. As has been stated heretofore, the use of starch-coated cloth does not provide the same advantage in cells designed for operation at ordinary temperatures, that is, temperatures above 0° F. With respect to cells of the conventional Leclanché type not containing lithium chloride in the electrolyte, when operated at ordinary temperatures those having paper separators exhibit capacity equal to or greater than those having cloth separators. Paper separators are extensively used in cells designed for operation at ordinary temperatures.

What is claimed is:

1. In a low temperature primary cell having a positive electrode and a negative electrode, a bibulous separator between said electrodes comprising a sheet of non-conductive porous cloth coated and impregnated with starch.

2. In a low temperature primary cell having a positive electrode and a negative electrode, an initially dry bibulous separator between said electrodes comprising a sheet of open-mesh, non-conductive cloth coated and impregnated with starch.

3. In a low temperature primary cell having a positive electrode and a negative electrode, a bibulous separator between said electrodes comprising a sheet of non-conductive porous cloth coated and impregnated with starch, said separator carrying a mercury compound which is soluble in water to an extent not exceeding 0.1 gram per 100 grams of water.

4. In a low temperature primary cell having a positive electrode and a zinc negative electrode, a bibulous separator between said electrodes comprising a sheet of open-mesh, non-conductive cloth coated and impregnated with starch.

5. In a low temperature primary cell having a positive electrode, a zinc negative electrode and a depolarizing mix, a bibulous separator between said depolarizing mix and said negative electrode comprising a sheet of open-mesh, non-conductive cloth coated and impregnated with starch.

6. In a low temperature primary cell having a positive electrode, a negative electrode, and an electrolyte containing a compound from the group consisting of lithium chloride and calcium chloride, a bibulous separator between said electrodes comprising a sheet of open-mesh, non-conductive cloth coated and impregnated with starch.

7. In a low temperature primary cell having a positive electrode, a negative electrode, and an electrolyte containing lithium chloride, a bibulous separator between said electrodes comprising a sheet of open-mesh, non-conductive cloth coated and impregnated with starch.

8. In a low temperature primary cell having a positive electrode, a negative electrode, and an electrolyte containing calcium chloride, a bibulous separator between said electrodes comprising a sheet of open-mesh, non-conductive cloth coated and impregnated with starch.

9. In making a low temperature cell having a positive electrode, a negative electrode and a moist depolarizing mix between said electrodes, the method which comprises placing adjacent to the negative electrode a dry bibulous separator comprising a sheet of porous non-conductive cloth coated and impregnated with starch, and compacting said moist mix between said separator and said positive electrode, whereby moisture from said mix is absorbed by said separator and said starch becomes soft and gelatinous.

References Cited in the file of this patent

UNITED STATES PATENTS

| | | |
|---|---|---|
| 405,196 | Barrett | June 11, 1889 |
| 1,140,826 | Hoppie | May 25, 1915 |
| 1,400,513 | Benner | Dec. 20, 1921 |
| 2,403,571 | Wilke | July 9, 1946 |
| 2,569,491 | Otto | Oct. 2, 1951 |